July 21, 1953 W. W. WOOD, JR 2,646,119
SCORING SYSTEM
Filed Aug. 27, 1951
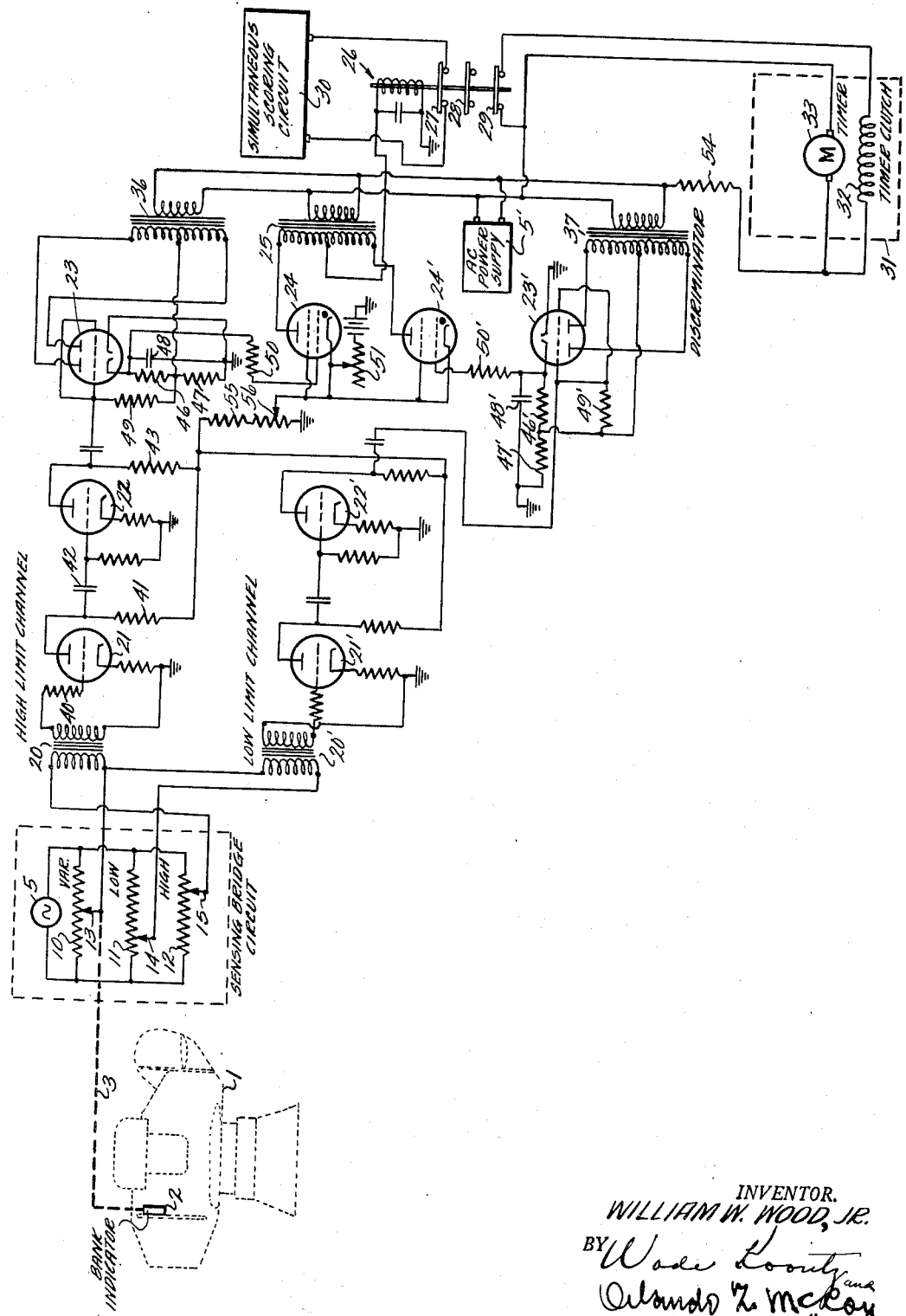
INVENTOR.
WILLIAM W. WOOD, JR.
BY
ATTORNEYS

Patented July 21, 1953

2,646,119

UNITED STATES PATENT OFFICE 2,646,119

SCORING SYSTEM

William W. Wood, Jr., Fenton, N. Y., assignor to the United States of America as represented by the Secretary of the Air Force Application August 27, 1951, Serial No. 243,826

3 Claims. (Cl. 161—15)

This invention concerns scoring systems and more particularly pertains to a scoring system indicating departures from prescribed limits.

In the past, direct observation and accounting have been used in making a record of departures from prescribed limits.

Objects of the present invention are to provide means for timing and scoring departures from prescribed limits with accuracy and speed and with a minimum of apparatus.

An operative embodiment of the present invention is illustrated in the single figure of the accompanying drawing showing a schematic circuit of a scoring system embodying the present invention as applied to an aircraft operation trainer shown in phantom outline.

One method for teaching an aircraft student pilot how to fly is for him to occupy a trainer 1 shown in dotted outline in the accompanying drawing and for him to operate the aircraft controls in response to instructions received through head phones. The accuracy of his operation of the controls on the aircraft within prescribed limits indicates his proficiency as a student. A bank indicator 2 within the trainer 1 represents a device to be operated by the student pilot within prescribed limits. A mechanical coupling 3 leads from the bank indicator 2 to outside of the trainer 1 for indicating and making a record of the performance of the student pilot.

The circuit shown in the accompanying drawing as embodying an illustrative example of the present invention comprises a Wheatstone bridge consisting of resistors 10 and 11 and 12 to which an alternating current source 5 applies its output in parallel. The mechanical coupling 3 from the bank indicator 2 is attached to a tap 13 on a variable potentiometer resistor 10 such that the tap 13 is moved with the operation of the bank indicator 2 by the student pilot within the trainer 1. A tap 14 on the resistor 11 is set at a low permissible limit above which the student pilot within the trainer 1 is to operate his bank indicator 2. A tap 15 on the potentiometer resistor 12 is set at a high permissible limit below which the student pilot within the trainer 1 is to operate his bank indicator 2. The described potentiometers 10, 11 and 12 with their variable contacts and power source will be referred to thereinafter as a sensing bridge circuit. The potentiometers in the sensing bridge circuit are high precision potentiometers.

The sensing bridge circuit passes its output to a pair of channel input transformers 20 and 20'. The input transformer 20 leads to a high limit channel and the input transformer 20' leads to a low limit channel. The high and low limit channels are substantially duplicates of each other and consequently corresponding components bear corresponding reference numerals, with the reference numerals unprimed in the high limit channel and primed in the low limit channel. Since the high and low limit channels are very much alike in both components and functions, a description of the construction and operation of the high limit channel will be adequate to explain both channels.

Within the sensing bridge circuit the variable potentiometer 10 with its tap 13 and the low limit potentiometer 11 with its tap 14 may be viewed as one set of four legs of a Wheatstone bridge. The variable potentiometer 10 with its tap 13 and the high potentiometer 12 with its tap 15 may, in a similar manner, be viewed as another set of four legs of another Wheatstone bridge.

In the event the student pilot within the trainer 1 moves the controls of the bank indicator 2 beyond the limit prescribed by the setting of the potentiometer tap 15 on its winding 12, then an electromotive force of a voltage determined by the amount of over-travel will be transmitted through the high limit channel input transformer 20, amplified by the series connected amplifier tubes 21 and 22 and impressed upon the pair of grids of the discriminator tube 23. The conduction of the discriminator tube 23 maintains a potential upon the grid of the thyratron 24 and causes it to maintain a direct current electromotive force through the upper half of the primary winding of a transformer 25 and the winding of a relay 26. The energization of the winding of the relay 26 opens the spring loaded normally closed relay contacts 27, 28 and 29. Opening the relay contact 29 stops a clock represented by the motor 33 and clutch 32 in the timer 31. Opening the contact 27 may stop a similar clock, not shown, in the simultaneous scoring circuit 30, or actuate such other device as may be desired.

When the student pilot within the trainer 1 returns the bank indicator 2 and the potentiometer 13 back within the permissible limits established by potentiometer contact 15 on its winding 12, the described electrical connections de-energize the relay winding 26 and cause the spring loaded relay contacts 27, 28 and 29 to again close. The closing of the relay contact 29 again impresses alternating current from a power supply 5' upon the timer 31 and again starts the clock. The power supply 5' preferably is common with the bridge power supply 5. Within the timer 31 the energization of the clutch 32 engages the clock motor 33. The alternating current power supply 5' supplies plate voltage to the discriminator tubes 23 and 23' through the transformers 36 and 37, respectively, and through the transformer 25 to the plates of the thyratrons 24 and 24'.

In the described manner, each time the student pilot in the trainer 1, by operation of the bank indicator 2, through its mechanical coupling 3, causes the potentiometer tap 13 to exceed the pre-established settings of the potentiometer taps 14 or 15 in the sensing bridge circuit, then an electrical output is passed through one or the other of the channel circuits and causes the clock in the timer 31 to be stopped. As a result a record is established on the clock in timer 31, indicating the total time during which the student pilot has remained within the permissible allowances in his manipulation of the bank indicator in the trainer 1. Also a record is established in the simultaneous scoring circuit 30 indicating the total time during which the variables selected are maintained within the permissible limits simultaneously. For example, if it is desired to know the total time during which bank and pitch simultaneously were within limits, the simultaneous scoring circuit 30 and its associated timer would run only when both bank and pitch were within limits.

It will be noted that the high and low limit resistances each form a bridge circuit with the variable resistance and determine not only at which point but also in what phase the voltages in the bridges are developed.

With the high limit and the low limit resistances positioned off center as shown in the drawing, a movement of the contact 13 of the variable resistance beyond the high limit position as previously established, develops a voltage between the contact 13 of the variable resistance and the contact 15 of the high limit resistance. This voltage will be of an amplitude determined by the amount of over-travel and of a phase that is acceptable to the high limit channel.

When the variable contact 13 is moved in the opposite direction and below the low limit position, the amount of the voltage developed is determined by the amount of over-travel, its phase is opposite to that developed on the high side and is acceptable to the low limit channel. The sensing bridge circuit may contain additional precision resistance potentiometers such as pitch, rate of turn, climb, air speed and the like, as desired.

Since the voltages applied to the potentiometers in the sensing bridge circuit are of alternating current, taking the high limit channel as an example, the instantaneous voltages are opposite at opposite ends of the high limit channel input transformer 20 primary winding. These voltages are shifted 180° through the transformer 20 and are applied to a two stage amplifier comprising the tubes 21 and 22 from which the amplified voltages are applied to the grids of the discriminator tube 23. If it be assumed that when the variable 13 is positioned within the set limits, the voltage applied to the grids of the discriminator tube 23 will be 180° out of phase with the voltage applied to the left anode of the tube 23 from the transformer 36. At the same time the voltage at the right anode of tube 23 supplied from the opposite end of transformer 36 will be in phase with the grid voltage. In this condition the right section only of tube 23 will conduct causing a voltage to be developed across the resistor 47, which is negative with respect to ground at the junction of resistors 46 and 47. This negative voltage applied to the control grid of the thyratron tube 24 is sufficient to prevent its firing. This condition will exist in both channels as long as the variable 13 in the sensing bridge circuit remains within specified limits between the low and the high limit potentiometer contacts 14 and 15. In the event the variable potentiometer contact 13 moves beyond the low limit established by tap 14 of low limit potentiometer 11, the voltage applied to the input transformer 20 of the high limit channel is then changed in phase. The voltage applied to the low limit channel input transformer 20' however becomes of opposite phase from that which was previously applied. Under this circumstance the voltage at the grids of the discriminator tube 23' becomes in phase with the voltage applied to the left anode of tube 23'. In this condition the left section only of tube 23' will conduct causing a voltage to be developed across the resistor 47' which is positive with respect to ground at the junction of the resistors 47' and 46'. This positive voltage applied to the control grid of the thyratron tube 24' is sufficient to fire the tube and to energize the relay 26 opening the contacts 27, 28 and 29. Opening of contact 27 causes the scoring to be interrupted in the simultaneous scoring circuit. Opening of contact 29 stops the clock in timer 31. The contact 28 may operate additional devices where desired.

Each high and low limit channel consists of two stages of amplification, a discriminator stage and a thyratron. The channel input transformers 20 and 20' have high impedance primary windings. The transformers 20 and 20' couple the signal from the sensing bridge circuit to the grids of the first channel amplifiers 21 or 21', respectively, each of which is a self-biased voltage amplifier stage.

In the high limit channel the secondary winding of the transformer 20 is connected to the grid of the amplifier tube 21 through a resistor 40. The voltage developed across a resistor 41, which is the plate load resistor of the tube 21, is applied to the grid of the amplifier tube 22 through a capacitor 42. The output from the second amplifier tube 22 is capacity coupled to both grids of the phase discriminator tube 23.

The alternating voltage developed across a resistor 43, which is the plate load resistor of the second amplifier tube 22, has been amplified illustratively 400 times so that a voltage of 1/100 volt applied to the grid of the first amplifier tube 21 is now applied to the grids of the discriminator tube 23 as approximately 4 volts.

The plate or anode supply voltages for the discriminator tube 23 are illustratively 225 volts of 60 cycle alternating current and are obtained from the secondary winding of a transformer 36 and are 180° out of phase. One cathode of the discriminator tube 23 is returned directly to ground and the other cathode is returned to ground through two resistors 46 and 47 connected in series and by-passed to ground through a capacitor 48. The junction of the resistors 46 and 47 is connected to the grid return resistor 49. The cathode end of the resistor 46 is coupled to the control grid of the thyratron 24 through a resistor 50. The firing point of the thyratron 24 is controlled by an adjustable direct current voltage through a variable potentiometer 51 and applied to the cathode of the thyratron 24.

The first or left hand anode of the discriminator tube 23 is connected to the upper-most terminal of the secondary winding of the transformer 36. When the voltage applied to the first or left hand anode of the phase discriminator tube 23 from the uppermost terminal of the secondary winding of the transformer 36 is of positive polarity then the voltage applied to the second or right hand anode of the tube 23 from the lower-most contact of the secondary winding of the transformer 36 is of negative polarity.

The voltage supply for the anodes of the discriminator tube 23 and for the sensing bridge circuit which supplies the signal voltage to the grid of the first amplifier 21 have a common source indicated as 5 and 5'. Connections are made in such a manner that when the limit setting is exceeded in the sensing bridge circuit the voltage applied to the grid of the first amplifier 21 and the voltage supplied to the first anode of the discriminator tube 23 are both of positive polarity. When this condition exists, the upper half of the secondary winding of the transformer 36 conducts and a voltage is developed across the cathode resistor 46 of the tube 23. This voltage is pulsating direct current and is filtered by the capacitor 48 which removes the A. C. component. The voltage developed across the resistor 46 is positive at the cathode end of the resistor and this voltage is applied through the resistor 50 to the control grid of the thyratron 24. The resistor 50 is used as a limiting resistor and prevents the control grid of the thyratron 24 from drawing excessive current.

If the voltage applied to the two grids of the discriminator tube 23 is slightly out of phase with the voltage of the first anode of this tube, the right hand or second section of the tube 23 that has its anode connected to the lower-most contact of the secondary winding of the transformer 36, will conduct to some slight extent. When this occurs a voltage is developed across the cathode resistor 47. This voltage across the cathode resistor 47 is of positive polarity at the ground end and is of negative polarity at the junction of the resistors 46 and 47. Since a voltage of negative polarity is already present at the junction of the resistors 46 and 47 due to the voltage developed across the resistor 46, these negative voltages are additive and hence the positive voltage at the cathode end of the resistor 46 becomes less positive by the amount of voltage developed across the cathode resistor 47. This reduction in positive voltage at the cathode end of the resistor 46 is not sufficient to prevent the firing of the thyratron 24. When the first or left hand side of the discriminator tube 23 is not conducting however or when there is zero input such as is obtained at the balance point of the bridge in the sensing bridge circuit, the voltage developed across the cathode resistor 47 will be of sufficient magnitude to cause the cathode end of the resistor 46 to be negative to such an extent as to prevent the firing of the thyratron tube 24.

A positive voltage applied to the cathode of the thyratron tube 24 through a thyratron bias potentiometer 55 and movable contact 56 may amount illustratively to approximately 14 volts direct current. This voltage acts as a stabilizing voltage to prevent the erratic firing of the thyratron 24 and the consequent chattering of the relay 26. When a positive voltage, obtained from the cathode of the discriminator tube 23, is applied to the control grid of the thyratron 24 it causes the thyratron 24 to conduct. The center tap on the secondary winding of the thyratron transformer 25 is connected through the coil of the relay 26 to ground, thereby completing the thyratron tube circuit. The firing of the thyratron tube 24 energizes the relay 26 to stop the electric timer 31.

The accuracy and the stability of the scoring system that is disclosed herein is due to a large extent to the operational characteristics of the discriminator circuit. The design of this circuit is such that the effect of stray pick up, slight phase differences or out of phase voltages, such as are developed when the student pilot within the trainer 1 is remaining within limits, are controlled by the discriminator circuit so as to avoid the accidental firing of the thyratron 24. The discriminator circuit discriminates against unwanted frequencies and unwanted phase, and reduces noise and quadrature susceptibility.

The functions of the discriminator tubes 23 and 23' are substantially identical for both the high limit and the low limit channels. The discriminator insures clean, positive action of the amplifier since any minor changes in voltage or phasing could only tend to intensify the discriminator action.

When the bridge within the sensing bridge circuit is operating within limits, with the potentiometer contact 13 between the potentiometer contacts 14 and 15, the voltage applied to the first or left hand anode of the discriminator tube 23 is 180° out of phase with the voltage applied to the grid of the tube 23 and consequently the first or left hand side of the tube will not conduct. The polarity of the voltage applied to the second or right hand anode of the discriminator tube 23 however is such that the second section of the tube 23 will conduct. When this occurs, a voltage is developed across the resistor 47 which is positive at its grounded end and negative at the junction of the resistors 46 and 47. The voltage at the cathode end of the resistor 46 becomes negative by the amount developed across the resistor 47 since the section of the tube 23 using the resistor 46 is not conducting and its voltage is zero. The negative voltage at the cathode end of the resistor 46 is applied through a resistor 50 to the control grid of the thyratron 24 and is sufficient to prevent its firing.

As the potentiometer variable arm 13 passes through one of the limit settings of the potentiometer arms 14 or 15, a point is reached where the voltage developed between the left end of the variable potentiometer resistor 10 and the potentiometer arm or contact 14 or between the right hand end of the variable potentiometer resistor 10 and the potentiometer tap 15, depending upon whether the variable arm 13 is at the left or right limit, is substantially zero. In common with all amplifiers, the scoring amplifier is subject to pick up at this point.

With the voltage developed between the right hand end of the variable potentiometer resistor 10 and the high limit tap 15 zero, undesirable line harmonics, such as those caused by switches, motors and the like, may be applied to the high limit channel transformer 20 and, after amplification, to the pair of grids in the discriminator tube 23. These high frequency undesirable harmonics will cause both sections of the discriminator tube 23 to conduct equal amounts of electricity and the cathode end of the resistor 46 and the cathode end of the resistor 47 will each become positive by an equal amount. Since the lower end of the cathode resistor 47 is grounded and the cathode end of the resistor 46 is connected through resistor 50 to the control grid of the thyratron 24, the voltage developed between the control grid of the thyratron 24 and ground will be zero and will have no effect on the thyratron 24. Thus the scoring amplifier is not subject to failure because of the pick up, due entirely to the action of the double discriminator circuit.

The thyratron bias potentiometer 55 with its movable contact 56 is in the plate circuit of the scoring amplifiers 21, 22, 21' and 22', as shown. This potentiometer 55, 56 controls the amplitude of the positive voltage applied to the cathodes of the thyratrons 24 and 24'. As the thyratron cathode is made more positive the grid becomes more negative and a point can be reached where the thyratrons 24 and 24' will not fire when limits are exceeded. On the other hand with insufficient bias the thyratrons 24 and 24' will fire continuously. A correct bias setting will be found to be when the potentiometer 55, 56 is set within the center 30% of the total potentiometer angular displacement and when the scoring relay 26 will operate without chattering when the limits are exceeded. Due to the amplitude of the positive voltage applied to the grids of the thyratrons 24 and 24' when limits are exceeded, this control has no effect on the limits and will not cause delayed firing of the thyratrons 24 and 24' or change the sensitivity of the system.

The disclosed scoring system records the time during which any group of devices illustrated herein by the bank indicator 2 in the trainer 1, is simultaneously held within its prescribed limits. Provision is made by the plurality of relay contacts 27, 28, 29 etc., for both simultaneous and separate scoring.

It is to be understood that the circuit and its components that are shown and described herein and its application to a representative device in an aircraft pilot trainer have been submitted for the purposes of illustrating and describing an operative embodiment of the present invention and that similarly functioning circuitry, components and applications may be made without departing from the scope of the present invention.

What I claim is:

1. A scoring system, comprising a sensing bridge circuit containing a variable potentiometer and an adjustable limit setting potentiometer connected as a Wheatstone bridge to produce an error voltage when the movement of the variable potentiometer exceeds the adjustment of the limit setting potentiometer, an amplifier discriminator circuit converting the error voltage from said sensing bridge circuit into a direct current and containing a discriminator tube having a cathode electrode, thyratron means in said discriminator circuit having a control grid biased by the cathode of said discriminator tube, relay means energized by the direct current from the amplifier discriminator circuit to open a relay contact, and a recording circuit energized upon an opening of the relay contact of said relay means.

2. A scoring system, comprising a sensing bridge circuit containing a variable potentiometer and a plurality of adjustable limit setting potentiometers connected to produce an error voltage when the movement of the variable potentiometer exceeds the adjustment of one of the limit setting potentiometers, an amplifier discriminator circuit containing a plurality of channels corresponding to the plurality of adjustable limit setting potentiometers in said sensing bridge circuit and converting the error voltage from said sensing bridge circuit into a direct current that is sustained during the time the movement of the variable potentiometer exceeds the setting of the limit setting potentiometer, a relay means energized by the direct current from the amplifier discriminator circuit to open a relay contact, and a timer circuit normally running a clock and deenergized to stop the clock during the time the variable potentiometer setting exceeds the adjustment of one of the limit setting potentiometers.

3. A scoring system, comprising a sensing bridge circuit containing a variable potentiometer and high limit and low limit adjustable limit setting potentiometers connected to produce an error voltage when the movement of the variable potentiometer exceeds the adjustment of one of the limit setting potentiometers, an alternating current source supplying electric energy to said sensing bridge circuit, a high limit channel containing a first amplifier inductively coupled with said sensing bridge circuit and containing a first phase discriminator and a first thyratron, a low limit channel containing a second amplifier inductively coupled with said sensing bridge circuit and containing a second phase discriminator and a second thyratron and said channel components powered from the alternating current supplying electrical energy to said sensing bridge circuit, and relay means selectively energized by the firing of said first or said second thyratron to open a plurality of relay contacts, a timer means stopped by the opening of a first of said relay contacts.

WILLIAM W. WOOD, Jr.

References Cited in the file of this patent

UNITED STATES PATENTS

| Number | Name | Date |
|---|---|---|
| 1,694,237 | Simonds | Dec. 4, 1928 |
| 1,921,172 | Taylor | Aug. 8, 1933 |
| 2,357,745 | Kliever | Sept. 5, 1944 |
| 2,414,467 | Hunt | Jan. 21, 1947 |